United States Patent
Kamiya et al.

(10) Patent No.: US 12,025,071 B2
(45) Date of Patent: Jul. 2, 2024

(54) METHOD FOR CONTROLLING INTERNAL COMBUSTION ENGINE, AND DEVICE FOR CONTROLLING INTERNAL COMBUSTION ENGINE

(71) Applicant: NISSAN MOTOR CO., LTD., Yokohama (JP)

(72) Inventors: Kohei Kamiya, Kanagawa (JP); Yuzuru Tohta, Kanagawa (JP); Jooyong Jung, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/267,651

(22) PCT Filed: Dec. 16, 2020

(86) PCT No.: PCT/JP2020/046900
§ 371 (c)(1),
(2) Date: Jun. 15, 2023

(87) PCT Pub. No.: WO2022/130527
PCT Pub. Date: Jun. 23, 2022

(65) Prior Publication Data
US 2023/0392562 A1 Dec. 7, 2023

(51) Int. Cl.
*F02D 41/04* (2006.01)
*F02D 41/30* (2006.01)

(52) U.S. Cl.
CPC ....... *F02D 41/042* (2013.01); *F02D 41/3005* (2013.01); *F02D 2200/0802* (2013.01); *F02D 2200/0812* (2013.01); *F02D 2200/501* (2013.01)

(58) Field of Classification Search
CPC ........ F02D 41/04; F02D 41/042; F02D 41/30; F02D 41/3005
(Continued)

(56) References Cited

U.S. PATENT DOCUMENTS 9,890,683 B2 * 2/2018 Shiomi ................. F02D 41/405
2015/0369153 A1 * 12/2015 Tsunooka .................. F01N 3/10
60/285
(Continued)

FOREIGN PATENT DOCUMENTS

JP 2009-024589 A 2/2009
JP 2010-121544 A 6/2010
(Continued)

*Primary Examiner* — John Kwon
*Assistant Examiner* — Johnny H Hoang
(74) *Attorney, Agent, or Firm* — Foley & Lardner LLP (57) ABSTRACT

An internal combustion engine (1) automatically stops when a predetermined idle stop condition is satisfied, and automatically restarts when a predetermined idle stop cancel condition is satisfied. The internal combustion engine (1) is controlled so that when fresh air does not flow into a GPF (18) even if fuel injection is stopped during operation of a vehicle, stop of the fuel injection is permitted even when temperature of GPF (18) is high. That is, the internal combustion engine (1) is controlled so that the stop of the fuel injection is forbidden when the temperature of the GPF (18) is higher than a predetermined temperature T1 and the stop of the fuel injection is allowed when the vehicle stops in a state in which the temperature of the GPF (18) is higher than the predetermined temperature (T1).

5 Claims, 5 Drawing Sheets

(58) Field of Classification Search
USPC ......... 701/102–105, 112–114; 123/299–305, 123/568.16, 568.31
See application file for complete search history.

(56) References Cited

U.S. PATENT DOCUMENTS

| | | | |
|---|---|---|---|
| 2017/0096920 A1* | 4/2017 | Fujii | F01N 9/002 |
| 2018/0106206 A1* | 4/2018 | Tsunoda | B60W 10/08 |
| 2018/0216552 A1* | 8/2018 | Yokoi | F01N 3/0842 |
| 2019/0315433 A1 | 10/2019 | Hasumi | |
| 2020/0025118 A1 | 1/2020 | Kurita et al. | |
| 2020/0223426 A1* | 7/2020 | Hara | F02D 41/0245 |
| 2021/0079860 A1* | 3/2021 | Yokoyama | F01N 3/023 |
| 2021/0231063 A1* | 7/2021 | Kobashi | F02D 41/1446 |

FOREIGN PATENT DOCUMENTS

| | | |
|---|---|---|
| JP | 2013-108474 A | 6/2013 |
| JP | 2020-012404 A | 1/2020 |
| WO | WO-2018/123160 A1 | 7/2018 |

\* cited by examiner

METHOD FOR CONTROLLING INTERNAL COMBUSTION ENGINE, AND DEVICE FOR CONTROLLING INTERNAL COMBUSTION ENGINE

The present invention relates to a method for controlling an internal combustion engine and a device for controlling the internal combustion engine.

BACKGROUND ART

For instance, Patent Document 1 discloses, as a technique, that during deceleration of a vehicle, when temperature of a GPF (Gasoline Particulate Filter) provided in an exhaust passage of an internal combustion engine is higher than a predetermined temperature (a prohibition temperature), by forbidding fuel cut of the internal combustion engine, an amount of oxygen supplied to the GPF is limited, so that soot deposited on the GPF does not burn at once, thereby preventing thermal degradation of the GPF.

However, in Patent Document 1, if the temperature of the GPF is higher than the predetermined temperature (the prohibition temperature), the fuel cut is always forbidden, then there is a risk that fuel economy (fuel efficiency) of the internal combustion engine will be deteriorated.

For instance, it is conceivable that if the amount of oxygen supplied to the GPF is in the limited state, even if the fuel cut (stop of fuel injection) of the internal combustion engine is performed when the temperature of the GPF is higher than the predetermined temperature (the prohibition temperature), the soot deposited on the GPF does not burn at once.

That is, in the internal combustion engine having the GPF, there is room for further improvement in implementation of forbidding the fuel cut of the internal combustion engine according to the GPF temperature.

CITATION LIST

Patent Document

Patent Document 1: Japanese Unexamined Patent Application Publication No. JP2020-012404

SUMMARY OF THE INVENTION

An internal combustion engine of the present invention is controlled so that stop of fuel injection is forbidden when temperature of an exhaust particulate filter provided in an exhaust passage of the internal combustion engine is higher than a predetermined temperature and the stop of the fuel injection is allowed when a vehicle stops in a state in which the temperature of the exhaust particulate filter is higher than the predetermined temperature.

According to the present invention, in a state in which the vehicle stops, even if the fuel injection is stopped, the exhaust particulate filter does not impair its intended performance, and improvement in fuel economy (fuel efficiency) by performing the stop of the fuel injection can be secured.

EMBODIMENTS FOR CARRYING OUT THE INVENTION

Figure 1:
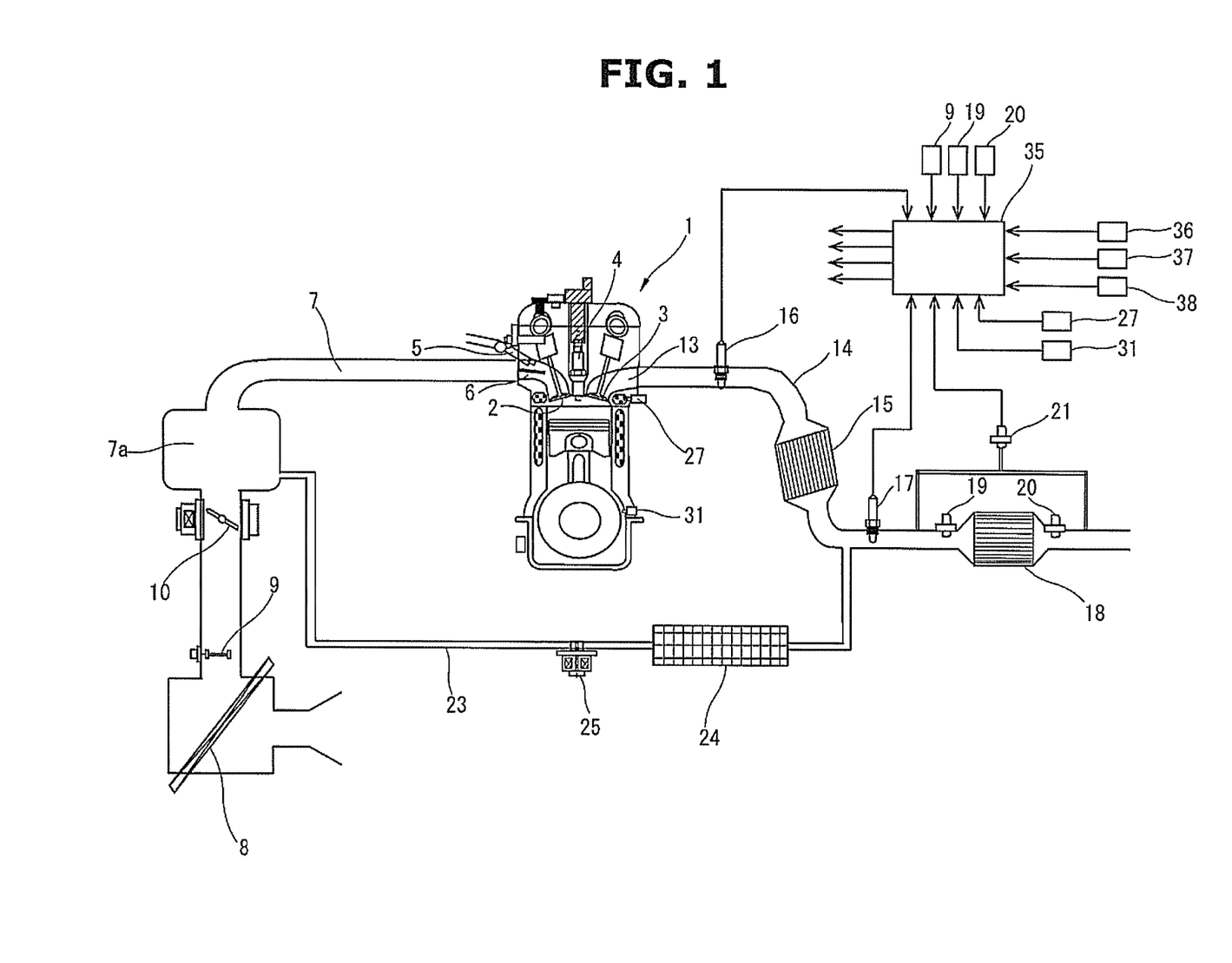
FIG. 1 is an explanatory drawing schematically showing a system configuration of an internal combustion engine to which the present invention is applied.

An embodiment of the present invention will be described in detail below with reference to the drawings. FIG. 1 is an explanatory drawing schematically showing a system configuration of an internal combustion engine 1.

Internal combustion engine 1 is, for instance, an in-line three-cylinder spark ignition internal combustion engine using gasoline as fuel, and is mounted as a drive source on a vehicle such as an automobile. That is, internal combustion engine 1 drives driving wheels (not shown) of the vehicle on which internal combustion engine 1 is mounted.

Internal combustion engine 1 is, for instance, the in-line three-cylinder spark ignition internal combustion engine, and has an ignition plug (a spark plug) 4 at a middle portion in a combustion chamber surrounded with an intake valve 2 and an exhaust valve 3.

A fuel injection valve 5 for injecting fuel toward intake valve 2 is arranged at an intake port 6 of internal combustion engine 1. Here, internal combustion engine 1 may be a cylinder direct injection internal combustion engine that directly injects fuel into a cylinder.

An intake passage 7 connected to intake port 6 has an intake collector 7a. At an upstream side of intake collector 7a, an air cleaner 8, an air flow meter 9 and an electronically controlled throttle valve 10 are arranged in this order from the upstream side of intake collector 7a.

A catalyst device 15 structured by three-way catalyst is provided in an exhaust passage 14 connected to an exhaust port 13 of internal combustion engine 1.

An air-fuel ratio sensor 16 is arranged at an upstream side of catalyst device 15. An O2 sensor 17 is arranged at a downstream side of catalyst device 15. Further, an exhaust particulate filter (hereinafter abbreviated as GPF) 18 for collecting PM that is exhaust particulates (Particulate Matter) in the exhaust is arranged at a downstream side of O2 sensor 17 in exhaust passage 14. GPF 18 has, for instance, a structure in which a sealed ceramic monolith filter is coated with a three-way catalyst. The upstream catalyst device 15 is located, for instance, in an engine room (an engine compartment) of the vehicle. GPF 18 is located, for instance, under a floor of the vehicle.

GPF 18 has an inlet-side temperature sensor 19 at an inlet side of GPF 18 and an outlet-side temperature sensor 20 at an outlet side of GPF 18. Inlet-side temperature sensor 19 detects an exhaust temperature of the inlet side of GPF 18. Outlet-side temperature sensor 20 detects an exhaust temperature of the outlet side of GPF 18. Further, in order to detect a pressure loss (i.e. a particulate deposition condition) in GPF 18, GPF 18 also has a differential pressure sensor 21 that responds to a pressure difference between the inlet side and the outlet side of GPF 18.

Internal combustion engine 1 is an engine that is capable of performing exhaust gas recirculation (EGR) in which a part of exhaust gas is introduced (recirculated) as EGR gas from exhaust passage 14 to intake passage 7. Internal combustion engine 1 has an exhaust gas recirculation passage 23 that branches off from exhaust passage 14 and is connected to intake passage 7.

This exhaust gas recirculation passage 23 is provided with an electric EGR valve 25 that controls a flow amount (a flow rate) of EGR gas in exhaust gas recirculation passage 23 and an EGR cooler 24 that can cool the EGR gas.

Internal combustion engine 1 has various sensors such as a cooling water temperature sensor 27 for detecting temperature of cooling water of internal combustion engine 1 and a crank angle sensor 31 for detecting a crank angle of a crankshaft (not shown). Crank angle sensor 31 is a sensor that can detect an engine rotation speed of internal combustion engine 1.

Detection signals of the various sensors are input to an engine controller 35. Engine controller 35 further inputs signals such as a detection signal of an accelerator opening sensor 36 that detects a depression amount of an accelerator pedal operated by a driver, a detection signal of an acceleration sensor 37 that can detect an acceleration of the vehicle and a vehicle speed signal from a vehicle speed sensor 38 that can detect a vehicle speed. Acceleration sensor 37 is a sensor that can detect an acceleration along a longitudinal direction of the vehicle.

Engine controller 35 calculates a required load (an engine load) of internal combustion engine 1 using the detection signal (a detection value) of accelerator opening sensor 36. Engine controller 35 can also calculate an SOC (State Of Charge) that is a ratio of remaining charge amount to a charge capacity of a vehicle-mounted battery (not shown).

Engine controller 35 performs overall control of internal combustion engine 1 on the basis of these detection signals. Engine controller 35 optimally control, for instance, a fuel injection amount and injection timing of fuel injection valve 5 for each cylinder, ignition timing of ignition plug 4 for each cylinder, an opening degree of throttle valve 10, an opening degree of EGR valve 25 and so on.

Engine controller 35 performs control (GPF regeneration control) that forcibly regenerates GPF 18 while considering also other conditions such as the temperature of GPF 18 when a particulate deposition condition (so-called clogging condition) of a predetermined level or more is detected in GPF 18.

More specifically, the GPF regeneration control is performed so that, for instance, by increasing the opening degree of throttle valve 10, an intake air amount and a fuel amount are increased, also by retarding the ignition timing, the exhaust temperature is increased, then the deposited exhaust particulates are burned and removed.

The temperature of GPF 18 is calculated by engine controller 35, for instance, using detection signals of inlet-side temperature sensor 19 and outlet-side temperature sensor 20. A deposition amount of the exhaust particulates deposited on GPF 18 is calculated by engine controller 35, for instance, using the detection signal of differential pressure sensor 21.

It is noted that in general, when the temperature of GPF 18 is high due to a high load operation etc., GPF 18 can be naturally or spontaneously regenerated. Therefore, the forced regeneration of GPF 18 is performed when the temperature of GPF 18 is low due to continuation of a low load operation etc. For instance, also when the accelerator opening is "0" that is a state in which the driver releases the accelerator pedal, the forced regeneration of GPF 18 is performed.

When predetermined automatic stop conditions are satisfied during travel of the vehicle or at a time of stop of the vehicle, fuel supply is stopped, and internal combustion engine 1 automatically stops. Then, when predetermined automatic restart conditions are satisfied during the automatic stop, internal combustion engine 1 restarts. That is, engine controller 35 automatically stops internal combustion engine 1 when the predetermined automatic stop conditions are satisfied, and automatically restarts internal combustion engine 1 when the predetermined automatic restart conditions are satisfied.

The automatic stop conditions of internal combustion engine 1 are, for instance, that the accelerator pedal is in a no-depression state, that the battery SOC of the vehicle-mounted battery is greater than a predetermined battery threshold value, and so on.

Internal combustion engine 1 automatically stops when all of these automatic stop conditions are satisfied. In other words, engine controller 35 automatically stops internal combustion engine 1 when all of these automatic stop conditions are satisfied while internal combustion engine 1 is running. That is, engine controller 35 corresponds to a control unit that stops fuel injection and automatically stops internal combustion engine 1 when the predetermined automatic stop conditions are satisfied.

The automatic restart conditions of internal combustion engine 1 are, for instance, that the accelerator pedal is in a depression state, that the battery SOC of the vehicle-mounted battery is equal to or less than the predetermined battery threshold value, and so on.

Internal combustion engine 1 restarts when there is a restart request during the automatic stop. In other words, engine controller 35 restarts internal combustion engine 1 when any of the above-described automatic restart conditions is satisfied during the automatic stop of internal combustion engine 1. For instance, internal combustion engine 1 during the automatic stop is restarted when the battery SOC of the vehicle-mounted battery becomes equal to or less than the predetermined battery threshold value.

That is, engine controller 35 corresponds to a control unit that automatically restarts internal combustion engine 1 when the predetermined automatic restart condition is satisfied.

As the automatic stop of internal combustion engine 1, for instance, it is idle stop, coast stop and sailing stop.

The idle stop is carried out, for instance, in a case where the above automatic stop conditions are satisfied when the vehicle temporarily stops. The idle stop is cancelled, for instance, when any of the above automatic restart conditions is satisfied.

The coast stop is carried out, for instance, in a case where the above automatic stop conditions are satisfied during travel of the vehicle. The coast stop is cancelled, for instance, when any of the above automatic restart conditions is satisfied. Here, the coast stop means that internal combustion engine 1 automatically stops, for instance, during deceleration in a brake pedal depression state at low vehicle speed.

The sailing stop is carried out, for instance, in a case where the above automatic stop conditions are satisfied during travel of the vehicle. The sailing stop is cancelled, for instance, when any of the above automatic restart conditions is satisfied. Here, the sailing stop means that internal combustion engine 1 automatically stops, for instance, during coasting travel without brake pedal depression at middle or high vehicle speed.

That is, the above automatic stop condition is a superordinate or generic concept including all of an idle stop condition for carrying out the idle stop, a coast stop condition for carrying out the coast stop and a sailing stop condition for carrying out the sailing stop.

Also, the above automatic restart condition is a superordinate or generic concept including all of an idle stop cancel condition for cancelling the idle stop, a coast stop cancel condition for cancelling the coast stop and a sailing stop cancel condition for cancelling the sailing stop.

Here, when the fuel injection of internal combustion engine 1 is stopped (fuel cut is performed) in a state in which the temperature of GPF 18 is high due to the regeneration of GPF 18 etc. during operation of the vehicle, fresh air flows into GPF 18, and the temperature of GPF 18 excessively rises, then there is a possibility that exhaust performance etc. of GPF 18 will be adversely affected.

In a case where the stop of the fuel injection of internal combustion engine 1 is forbidden (prohibited) (the fuel cut is forbidden (prohibited)) when the temperature of GPF 18 is high, although the excessive rise in the temperature of GPF 18 due to the inflow of the fresh air is prevented, because the stop of the fuel injection of internal combustion engine 1 is always forbidden (the fuel cut is always forbidden) when the temperature of GPF 18 is high, there is a risk that fuel economy (fuel efficiency) of internal combustion engine 1 will be deteriorated.

In the case of the idle stop carried out in a state in which the vehicle stops, when the fuel injection of internal combustion engine 1 is stopped (the fuel cut is performed), rotation of the crankshaft stops, then fresh air does not flow into GPF 18.

Therefore, engine controller 35 controls internal combustion engine 1 so that when the fresh air does not flow into GPF 18 even if the fuel injection is stopped (the fuel cut is performed) during operation of the vehicle, the stop of the fuel injection is permitted (the fuel cut is permitted) even when the temperature of GPF 18 is high.

That is, engine controller 35 basically forbids the stop of the fuel injection when the temperature of GPF 18 is higher than a predetermined temperature, and allows the stop of the fuel injection when the vehicle stops in the state in which the temperature of GPF 18 is higher than the predetermined temperature.

More specifically, engine controller 35 corresponds to the control unit, and forbids the stop of the fuel injection when the temperature during regeneration of GPF 18 is higher than a predetermined temperature T1 and the deposition amount of the exhaust particulates deposited on GPF 18 is equal to or greater than a predetermined second deposition amount V2 (a first deposition amount) during operation of the vehicle, but allows the stop of the fuel injection when the vehicle stops even if GPF 18 is being regenerated in the state in which the temperature of GPF 18 is higher than the predetermined temperature T1 and the deposition amount of the exhaust particulates deposited on GPF 18 is equal to or greater than the second deposition amount V2.

In the state in which the vehicle stops, the rotation of the crankshaft of internal combustion engine 1 stops, then fresh air does not flow into GPF 18. Therefore, even if the fuel injection is stopped (the fuel cut is performed), GPF 18 can be prevented from becoming excessively high temperature. That is, in the state in which the vehicle stops, even if the fuel injection is stopped (the fuel cut is performed), GPF 18 does not impair its intended performance, and improvement in the fuel economy (the fuel efficiency) by performing the stop of the fuel injection (performing the fuel cut) can be secured.

Further, engine controller 35 forbids the stop of the fuel injection in a case where the temperature of GPF 18 is equal to or lower than the predetermined temperature and also the deposition amount of the exhaust particulates deposited on GPF 18 is equal to or greater than a predetermined amount when the vehicle stops.

More specifically, engine controller 35 forbids the stop of the fuel injection in a case where the temperature of GPF 18 is equal to or lower than the predetermined temperature T1 and also the deposition amount of the exhaust particulates deposited on GPF 18 is equal to or greater than a predetermined first deposition amount V1 (a second deposition amount) when the vehicle stops. The first deposition amount V1 is a value that is smaller than the above second deposition amount V2.

In the case where the temperature of GPF 18 is low (the predetermined temperature T1 or lower) and the deposition amount of the exhaust particulates deposited on GPF 18 is the predetermined amount (the first deposition amount V1) or greater, the stop of the fuel injection is forbidden (the fuel cut is forbidden) and increase in the temperature of GPF 18 is promoted, then an appropriate purification effect of GPF 18 can always be obtained.

Furthermore, engine controller 35 allows the stop of the fuel injection in a case where the temperature of GPF 18 is higher than the predetermined temperature and also the deposition amount of the exhaust particulates deposited on GPF 18 is less than the predetermined amount.

More specifically, engine controller 35 allows the stop of the fuel injection (allows the fuel cut) in a case where the temperature of GPF 18 is higher than the predetermined temperature T1 and also the deposition amount of the exhaust particulates deposited on GPF 18 is less than the first deposition amount V1.

In a scene in which the purification effect of GPF 18 can be appropriately obtained and the exhaust performance is not affected, by allowing permitting the stop of the fuel injection (allowing permitting the fuel cut), the fuel economy (the fuel efficiency) can be improved.

Engine controller 35 judges the vehicle stop using the detection signal of acceleration sensor 37 and the detection signal of vehicle speed sensor 38.

By judging the vehicle stop using the two different sensors (two types of sensors) in this manner, even in a case where one of these sensors fails, it is possible to prevent GPF 18 from impairing its intended performance which is caused by excessive increase in the temperature of GPF 18 due to erroneously judging that the vehicle stops.

Figure 2:
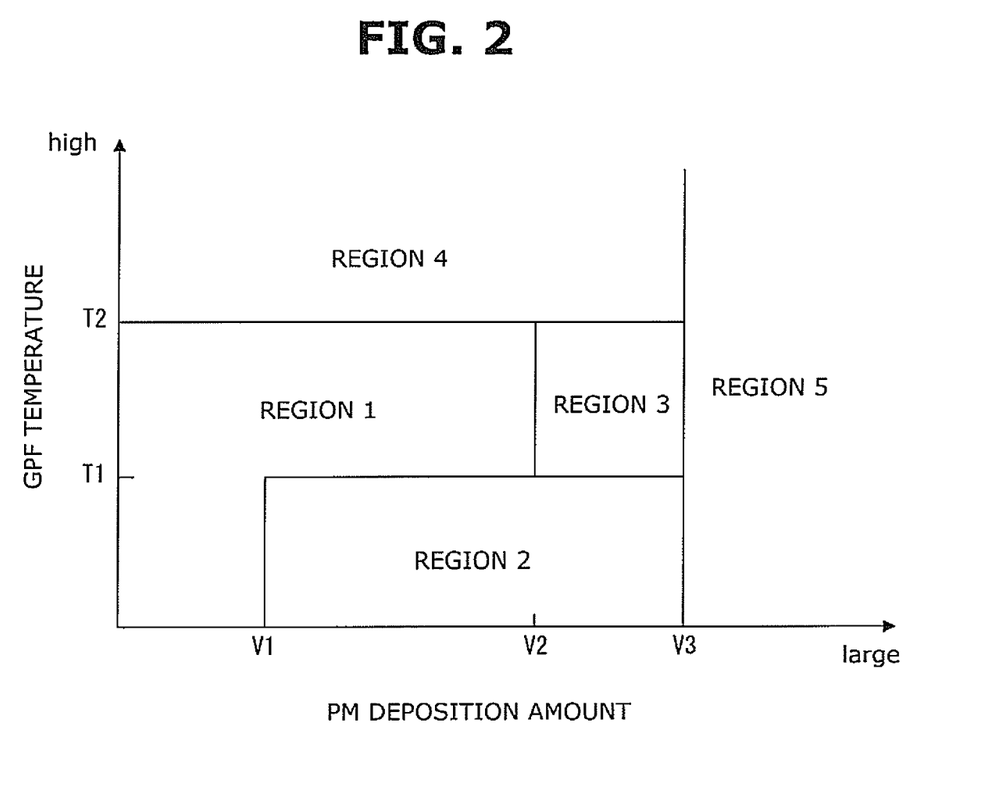
FIG. 2 is an explanatory drawing schematically showing conditions of a GPF.

FIG. 2 is an explanatory drawing schematically showing conditions of GPF 18 with the temperature of GPF 18 being a vertical axis and the deposition amount (a PM deposition amount) of the exhaust particulates deposited on GPF 18 being a horizontal axis.

A region 1 is a region including a region where the temperature of GPF 18 is higher than the predetermined temperature T1 and also the PM deposition amount of GPF 18 is less than the first deposition amount V1.

More specifically, the region 1 is a region formed by combining a region where the temperature of GPF 18 is higher than the predetermined temperature T1 and equal to or lower than a high temperature threshold value T2 and also the PM deposition amount of GPF 18 is less than the first deposition amount V1, a region where the temperature of GPF 18 is higher than the predetermined temperature T1 and equal to or lower than the high temperature threshold value T2 and also the PM deposition amount of GPF 18 is equal to or greater than the first deposition amount V1 and less than the second deposition amount V2 and a region where the temperature of GPF 18 is equal to or lower than the predetermined temperature T1 and also the PM deposition amount of GPF 18 is less than the first deposition amount V1.

The region 1 is a normal region where the exhaust purification effect by GPF 18 can be obtained. When the condition of GPF 18 is in the region 1, the fuel cut by the automatic stop of internal combustion engine 1 is permitted.

A region 2 is a region including a region where the temperature of GPF 18 is equal to or lower than the predetermined temperature T1 and also the PM deposition amount of GPF 18 is equal to or greater than the predetermined first deposition amount.

More specifically, the region 2 is a region where the temperature of GPF 18 is lower than the predetermined temperature T1 and also the PM deposition amount of GPF 18 is equal to or greater than the first deposition amount V1 and less than a third deposition amount V3. The third deposition amount V3 is a value that is greater than the second deposition amount V2.

The region 2 is a heat-up region where the temperature of GPF 18 is made to increase. In the region 2, for instance, internal combustion engine 1 is controlled so as to increase fluidity in the combustion chamber by lowering a residual gas ratio of internal combustion engine 1. Further, in the region 2, for instance, internal combustion engine 1 is controlled so as to be operated at an operating point on a higher load side than that of the region 1. Furthermore, in the region 2, for instance, internal combustion engine 1 is controlled so that an air-fuel ratio is made stoichiometric then the ignition timing is retarded more than a normal ignition timing as compared with the region 1. When the condition of GPF 18 is in the region 2, the fuel cut by the automatic stop of internal combustion engine 1 is forbidden. When the condition of GPF 18 is in the region 2, internal combustion engine 1 is generally controlled so that the temperature of GPF 18 and the PM deposition amount of GPF 18 are in the region 1 or the region 3.

A region 3 is a region including a region where the temperature of GPF 18 is higher than the predetermined temperature T1 and also the PM deposition amount of GPF 18 is equal to or greater than the second deposition amount V2.

More specifically, the region 3 is a region where the temperature of GPF 18 is higher than the predetermined temperature T1 and lower than the predetermined high temperature threshold value T2 and also the PM deposition amount of GPF 18 is equal to or greater than the second deposition amount V2 and less than the third deposition amount V3.

The region 3 is a regeneration region where the regeneration of GPF 18 is performed. Further, the region 3 is a region where the temperature of GPF 18 is high and PM deposition amount of GPF 18 becomes large, and a region where it is desirable to decrease the exhaust temperature as compared with that of the region 2.

In the region 3, for instance, internal combustion engine 1 is controlled so that in order to decrease the exhaust temperature, the air-fuel ratio is made richer than that of the region 2, and the ignition timing is not retarded from the normal ignition timing. When the condition of GPF 18 is in the region 3, if the vehicle is in the stop state, the fuel cut by the automatic stop of internal combustion engine 1 is permitted. When the condition of GPF 18 is in the region 3, if the vehicle is not in the stop state, the fuel cut by the automatic stop of internal combustion engine 1 is forbidden. When the condition of GPF 18 is in the region 3, internal combustion engine 1 is generally controlled so that the temperature of GPF 18 and the PM deposition amount of GPF 18 are in the region 1 or the region 2.

A region 4 is a region where the temperature of GPF 18 is higher than the high temperature threshold value T2 and also the PM deposition amount of GPF 18 is less than the third deposition amount V3. The region 4 is an overheat region where the temperature of GPF 18 is high. Engine controller 35 controls internal combustion engine 1 so that the condition of GPF 18 does not fall in the region 4.

A region 5 is a region where the PM deposition amount of GPF 18 is equal to or greater than the predetermined third deposition amount V3. The region 5 is a prohibition region. Engine controller 35 controls internal combustion engine 1 so that the condition of GPF 18 does not fall in the region 4. In a case where the condition of GPF 18 falls in the region 5, it is necessary to notify the driver, for instance, by displaying a warning light, and to carry out maintenance of GPF 18 at a repair shop etc.

Figure 3:
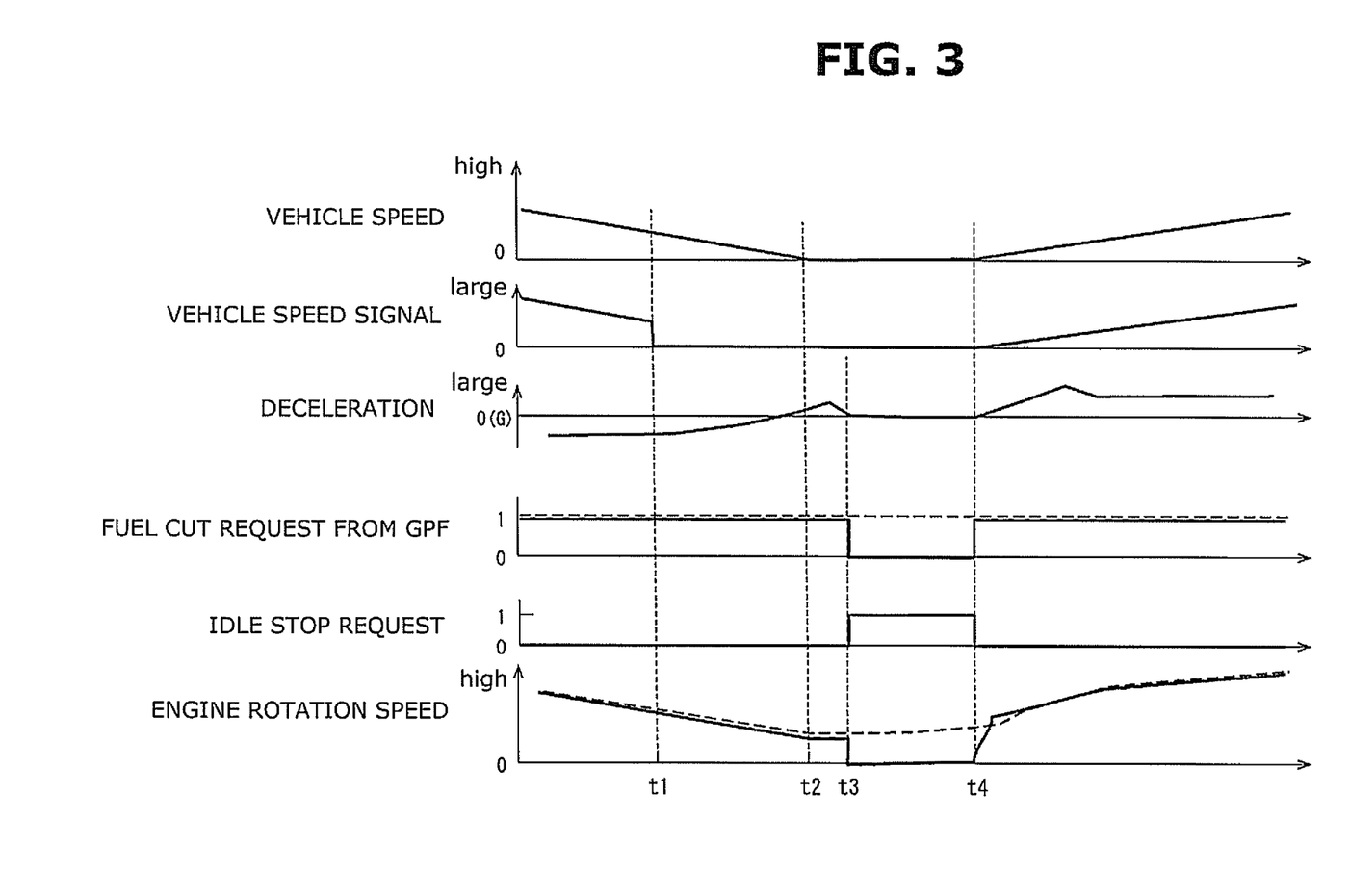
FIG. 3 is a timing chart showing an example of operation when a vehicle is temporarily stopped.

FIG. 3 is a timing chart showing an example of operation when the vehicle is temporarily stopped while the condition of GPF 18 is in the region 3.

Time t1 in FIG. 3 is a timing at which the vehicle speed detected by vehicle speed sensor 38 becomes "0". Time t2 in FIG. 3 is a timing at which an actual vehicle speed of the vehicle becomes "0". Time t3 in FIG. 3 is a timing at which deceleration of the vehicle detected by acceleration sensor 37 becomes "0". Time t4 in FIG. 3 is a timing at which the vehicle starts moving from the vehicle stop state.

In the example shown in FIG. 3, since the vehicle stops on flat ground, the deceleration is "0" from time t3 to time t4. In the example shown in FIG. 3, at the timing of time t3, the idle stop condition (the automatic stop condition) is satisfied, and a flag indicating an idle stop request is switched from "0" to "1". Regarding the idle stop request, when the flag is "0", the idle stop is not requested, and when the flag is "1", the idle stop is requested.

As illustrated in FIG. 3, the detection value of vehicle speed sensor 38 may decrease in accuracy immediately before the vehicle stop. Because of this, there arises a difference (or a shift) between the timing at which the vehicle stop is detected by the detection signal of acceleration sensor 37 and the timing at which the vehicle stop is detected by the detection signal of vehicle speed sensor 38. In the above embodiment, at the timing (time t3 at which the vehicle stop is detected by the detection signal of acceleration sensor 37) after a predetermined time has elapsed from the timing at which the vehicle stop is detected by vehicle speed sensor 38, the vehicle is judged to have stopped.

In the example shown in FIG. 3, since the condition of GPF 18 is in the above-described region 3 at time t3, the flag indicating a fuel cut request from GPF 18 is switched from "1" to "0" at the timing of time t3 at which the vehicle is judged to have stopped. Regarding the fuel cut request from GPF 18, when the flag is "0", the fuel cut is permitted, and when the flag is "1", the fuel cut is forbidden.

When the condition of GPF 18 is in the region 1, since the fuel cut is permitted, the flag indicating the fuel cut request from GPF 18 becomes "0". When the condition of GPF 18 is in the region 2, since the fuel cut is forbidden, the flag indicating the fuel cut request from GPF 18 becomes "1". When the condition of GPF 18 is in the region 3, since the fuel cut is permitted if the vehicle is in the stop state, the flag indicating the fuel cut request from GPF 18 becomes "0". When the condition of GPF 18 is in the region 3, since the fuel cut is forbidden if the vehicle is not in the stop state, the flag indicating the fuel cut request from GPF 18 becomes "1".

Therefore, in the example show in FIG. 3, at the timing of time t3, the flag indicating the idle stop request becomes "1", and the flag indicating the fuel cut request from GPF 18 becomes "0", then the fuel injection of internal combustion engine 1 is stopped and internal combustion engine 1 stops.

In the example shown in FIG. 3, at the timing of time t4, the idle stop cancel condition (the automatic restart condition) is satisfied, and the flag indicating the idle stop request is switched from "1" to "0". In the example show in FIG. 3, at the timing of time t4, the flag indicating the fuel cut request from GPF 18 is switched from "0" to "1" in response to the vehicle starting moving.

Therefore, in the example show in FIG. 3, at the timing of time t4, the flag indicating the idle stop request becomes "0", and the flag indicating the fuel cut request from GPF 18 becomes "1", then the fuel injection of internal combustion engine 1 is resumed and internal combustion engine 1 starts.

In a case where the stop of the fuel injection of internal combustion engine 1 is uniformly forbidden (the fuel cut is uniformly forbidden) when the temperature of GPF 18 is high, as shown by broken lines in FIG. 3, the fuel cut request from GPF 18 is not switched to "0" at time t3, and consequently the fuel economy (the fuel efficiency) of internal combustion engine 1 is deteriorated by an amount of operation of internal combustion engine 1 from time t3 to time t4.

That is, when the condition of GPF 18 is in the region 3, if the fuel cut of internal combustion engine 1 is forbidden because the temperature is high even if the idle stop condition is satisfied, as shown by broken lines in FIG. 3, the fuel economy (the fuel efficiency) of internal combustion engine 1 is deteriorated by an amount of operation of internal combustion engine 1 from time t3 to time t4.

Figure 4:
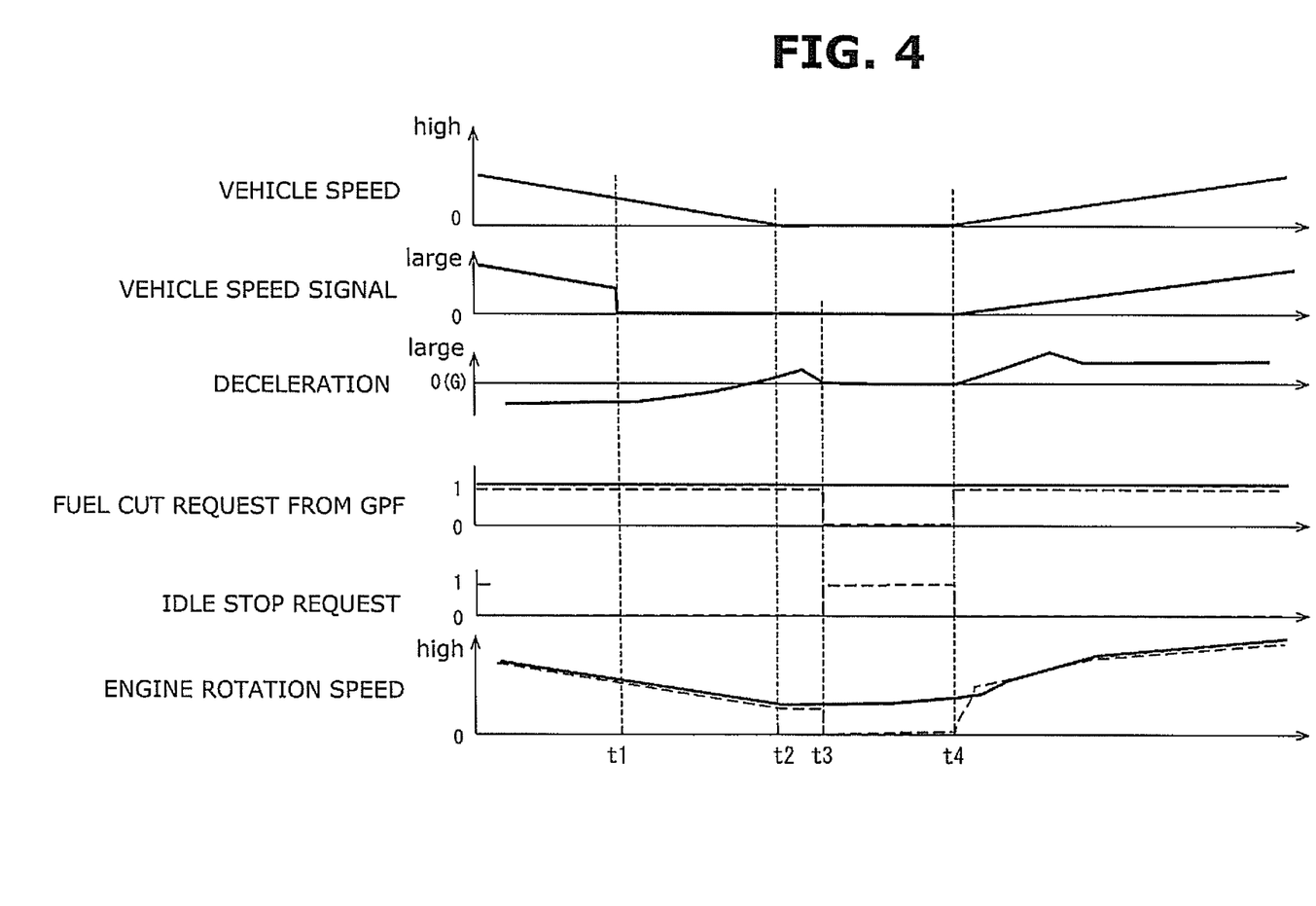
FIG. 4 is a timing chart showing an example of operation when a vehicle is temporarily stopped.

FIG. 4 is a timing chart showing an example of operation when the vehicle is temporarily stopped while the condition of GPF 18 is in the region 2.

Time t1 in FIG. 4 is a timing at which the vehicle speed detected by vehicle speed sensor 38 becomes "0". Time t2 in FIG. 4 is a timing at which an actual vehicle speed of the vehicle becomes "0". Time t3 in FIG. 4 is a timing at which deceleration of the vehicle detected by acceleration sensor 37 becomes "0". Time t4 in FIG. 4 is a timing at which the vehicle starts moving from the vehicle stop state.

In the example shown in FIG. 4, since the temperature of GPF 18 is low, the idle stop condition (the automatic stop condition) is not satisfied at the timing of time t3, and the flag indicating the idle stop request maintains "0". In the example shown in FIG. 4, since the condition of GPF 18 is in the above-described region 2 at time t3, the flag indicating the fuel cut request from GPF 18 is not switched from "1" to "0" at the timing of time t3 at which the vehicle is judged to have stopped.

Therefore, in the example show in FIG. 4, at and after the timing of time t3, the fuel injection of internal combustion engine 1 is not stopped, and internal combustion engine 1 continues an idling operation.

In a case where the fuel injection of internal combustion engine 1 is stopped (the fuel cut is performed) when the temperature of GPF 18 is low, as shown by broken lines in FIG. 4, the fuel cut request from GPF 18 is switched to "0" and the idle stop request is switched to "1" at time t3, and consequently the temperature of GPF 18 is decreased by an amount of stop of internal combustion engine 1 from time t3 to time t4, then the exhaust performance is deteriorated.

Figure 5:
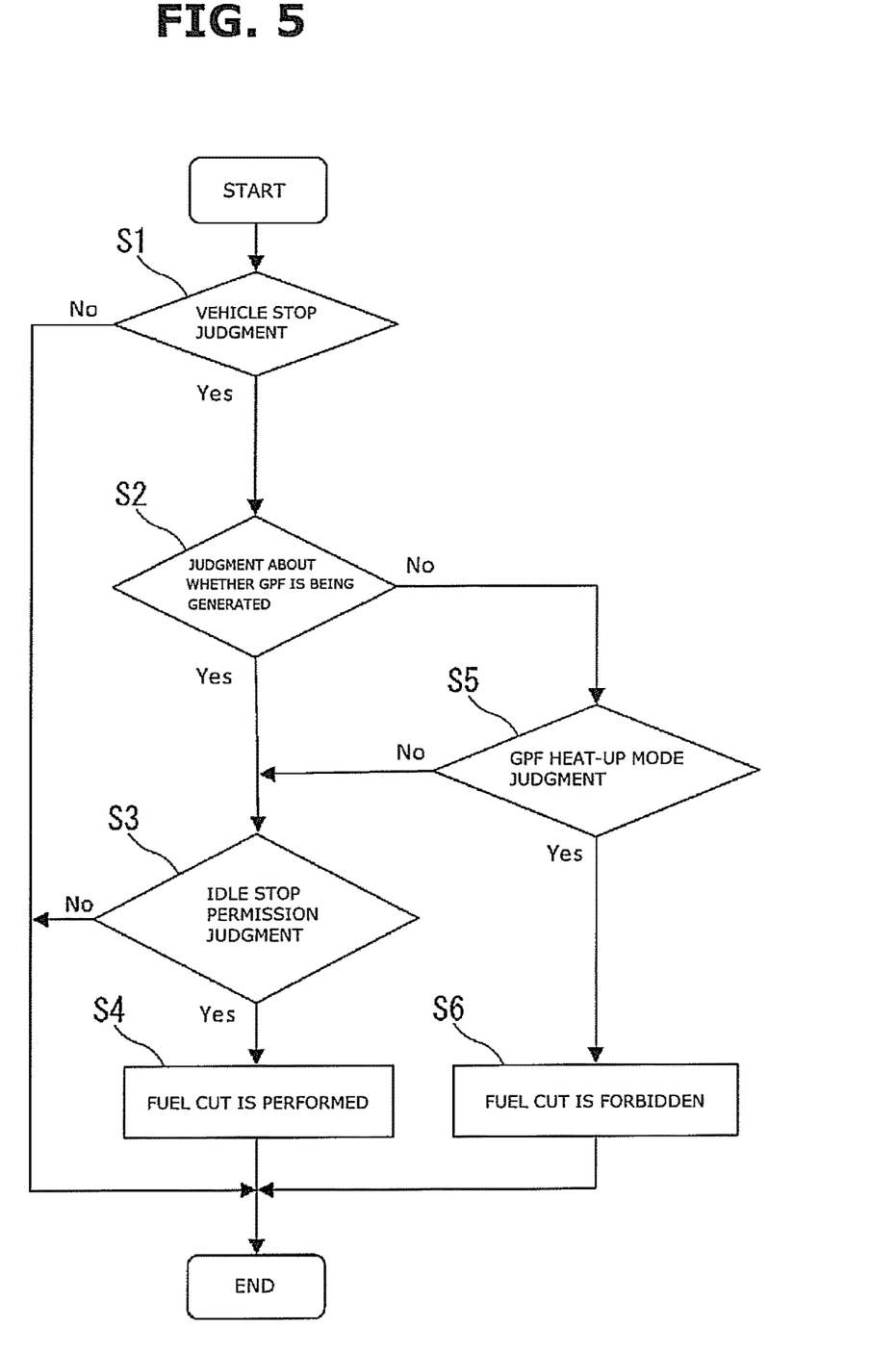
FIG. 5 is a flow chart showing a flow of control of the internal combustion engine according to the present invention.

FIG. 5 is a flow chart showing a flow of the above-described control of internal combustion engine 1.

At step S1, a judgment is made as to whether or not the vehicle stops. If the vehicle stops, the routine proceeds to step S2. If the vehicle does not stop, a current routine is ended.

At step S2, a judgment is made as to whether or not GPF 18 is being generated. If GPF 18 is being generated, the routine proceeds to step S3. If GPF 18 is not being generated, the routine proceeds to step S5.

At step S3, a judgment is made as to whether or not the idle stop is permitted. That is, at step S3, if the idle stop condition is satisfied and also the fuel cut is permitted by the fuel cut request from GPF 18, the idle stop is judged to be permitted. When judging that the idle stop is permitted, the routine proceeds to step S4, and the fuel cut is performed.

At step S5, a judgment is made as to whether or not GPF 18 is in a heat-up mode. That is, at step S5, a judgment is made as to whether or not the condition of GPF 18 is in the region 2. If the condition of GPF 18 is judged to be in the region 2, the routine proceeds to step S6, and the fuel cut is forbidden. If the condition of GPF 18 is not judged to be in the region 2, the routine proceeds to step S3.

Although the embodiment of the present invention has been described above, the present invention is not limited to the above embodiment, and various modifications can be made without departing from the scope of the present invention.

For instance, the high temperature threshold value T2 can be set so as to be changed according to the PM deposition amount of GPF 18. More specifically, for instance, the high temperature threshold value T2 can be set so that as the PM deposition amount of GPF 18 increases, the high temperature threshold value T2 is lower.

When judging the vehicle stop using the detection signal of acceleration sensor 37, the vehicle stop could be judged not using the deceleration of the vehicle, but using a variation (an amount of change) of the deceleration of the vehicle.

The above-described embodiment relates to the method for controlling the internal combustion engine and the control device of the internal combustion engine.

The invention claimed is:

1. A method for controlling an internal combustion engine mounted on a vehicle that can stop fuel injection and automatically stop the internal combustion engine, the internal combustion engine provided with an exhaust passage and an exhaust particulate filter provided in the exhaust passage, the exhaust particulate filter having a temperature sensor that detects temperature of the exhaust particulate filter and a differential pressure sensor that detects a deposition amount of exhaust particulates deposited on the exhaust particulate filter, the method comprising:

detecting the temperature of the exhaust particulate filter by the temperature sensor;

detecting the deposition amount of the exhaust particulates deposited on the exhaust articulate filter by the differential pressure sensor;

when the temperature of the exhaust particulate filter is higher than a predetermined temperature and also the deposition amount of the exhaust particulates deposited on the exhaust particulate filter is equal to or greater than a predetermined amount, forbidding stop of the fuel injection;

when the temperature of the exhaust particulate filter is higher than the predetermined temperature and also the deposition amount of the exhaust particulates deposited on the exhaust particulate filter is less than the predetermined amount, allowing the stop of the fuel injection; and when the vehicle stops in a state in which the temperature of the exhaust particulate filter is higher than the predetermined temperature, stopping the fuel injection and allowing automatic stop of the internal combustion engine.

2. The method for controlling the internal combustion engine as claimed in claim 1, further comprising:

in a case where the temperature of the exhaust particulate filter is equal to or lower than the predetermined temperature by detecting the temperature of the exhaust particulate filter by the temperature sensor and also the deposition amount of the exhaust particulates deposited on the exhaust particulate filter is equal to or greater than the predetermined amount by detecting the deposition amount of the exhaust particulates deposited on the exhaust particulate filter by the differential pressure sensor when the vehicle stops, forbidding the stop of the fuel injection.

3. The method for controlling the internal combustion engine as claimed in claim 1, further comprising:

judging the vehicle stop using a detection signal of a vehicle speed sensor that detects a vehicle speed and a detection signal of an acceleration sensor that detects an acceleration along a longitudinal direction of the vehicle.

4. The method for controlling the internal combustion engine as claimed in claim 1, further comprising:

when a predetermined time elapses from the vehicle stop, stopping the fuel injection.

5. A control device of an internal combustion engine comprising:

the internal combustion engine mounted on a vehicle that can stop fuel injection and automatically stop the internal combustion engine;

an exhaust particulate filter provided in an exhaust passage of the internal combustion engine, the exhaust particulate filter having a temperature sensor that detects temperature of the exhaust particulate filter and a differential pressure sensor that detects a deposition amount of exhaust particulates deposited on the exhaust particulate filter; and a control unit configured to when the temperature of the exhaust particulate filter is higher than a predetermined temperature by detecting the temperature of the exhaust particulate filter by the temperature sensor and also the deposition amount of the exhaust particulates deposited on the exhaust particulate filter is equal to or greater than a predetermined amount by detecting the deposition amount of the exhaust particulates deposited on the exhaust particulate filter by the differential pressure sensor, forbid stop of the fuel injection, when the temperature of the exhaust particulate filter is higher than the predetermined temperature and also the deposition amount of the exhaust particulates deposited on the exhaust particulate filter is less than the predetermined amount, allow the stop of the fuel injection, and when the vehicle stops in a state in which the temperature of the exhaust particulate filter is higher than the predetermined temperature, stop the fuel injection and allow automatic stop of the internal combustion engine.

* * * * *